United States Patent
Lee et al.

(10) Patent No.: US 6,839,516 B2
(45) Date of Patent: Jan. 4, 2005

(54) APPARATUS AND METHOD FOR VISUALIZING AN AUTOMATIC LASER SHUTDOWN STATE IN AN OPTICAL TRANSMISSION SYSTEM

(75) Inventors: Byung Tak Lee, Suwon (KR); Jong Hoon Kim, Seoul (KR); Chang Bae Hyun, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 09/939,559

(22) Filed: Aug. 28, 2001

(65) Prior Publication Data

US 2002/0024703 A1 Feb. 28, 2002

(30) Foreign Application Priority Data

Aug. 31, 2000 (KR) ........................................ 2000 51177

(51) Int. Cl.[7] .......................... H04B 10/08; H04B 10/00
(52) U.S. Cl. ............................. 398/15; 398/17; 398/172
(58) Field of Search .............................. 398/15, 16, 17, 398/18, 19, 172

(56) References Cited

U.S. PATENT DOCUMENTS

| 5,451,765 | A  |   | 9/1995 | Gerber |
| 5,966,206 | A  |   | 10/1999 | Jander |
| 6,194,707 | B1 | * | 2/2001 | Yang ..................... 250/227.15 |
| 6,504,630 | B1 | * | 1/2003 | Czarnocha et al. ........... 398/15 |
| 6,626,587 | B1 | * | 9/2003 | Marmur ....................... 398/17 |

* cited by examiner

Primary Examiner—Leslie Pascal
Assistant Examiner—Dzung Tron
(74) Attorney, Agent, or Firm—Fleshner & Kim, LLP

(57) ABSTRACT

An apparatus and method are disclosed for visualizing an automatic laser shutdown (ALS) state. An operator is informed of the ALS state by transmitting a visible light with weak power, to an optical fiber, that effuses from the cut position of the optical fiber. The operator recognizes the cut position of the optical fiber by comparing the power of the ALS visible light reflected from the cut surface of the optical fiber and that of the transmitting ALS visible light, and thus restores the cut optical fiber at the recognized position.

30 Claims, 3 Drawing Sheets

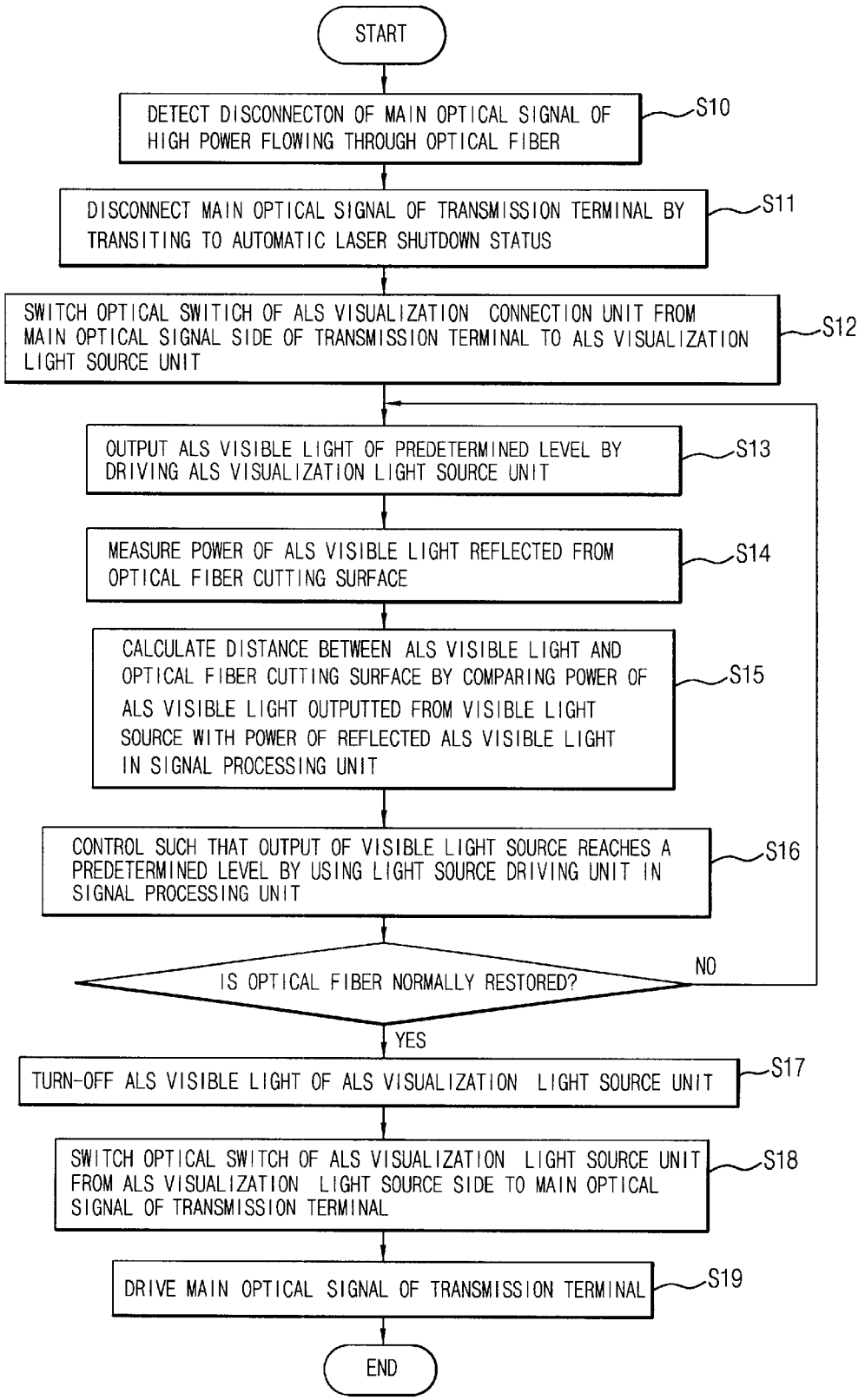

APPARATUS AND METHOD FOR VISUALIZING AN AUTOMATIC LASER SHUTDOWN STATE IN AN OPTICAL TRANSMISSION SYSTEM

BACKGROUND OF THE INVENTION 1. Field of the Invention

The present invention relates to an optical transmission system, and, more particularly, to an apparatus and method for visualizing an automatic laser shutdown (ALS) state. The invention is capable of visually showing an ALS state to an operator located at a cut position of an optical fiber.

2. Background of the Related Art

Optical transmission systems utilizing optical fiber form the basis of large-scale communication systems, today. As the capacity of the optical transmission system increases, the power of the main signal transmitted through the optical fiber is proportionately increased. For example, in the case of a wavelength division multiplexing optical transmission system, the main signal power flowing through an optical fiber has increased to a number of watts. With such high power flowing through the very small cross-sectional area of a fiber, it is very important to protect the eyes and skin of an operator located at a cut position, when the optical fiber is cut.

Therefore, the ITU-T G.681 (International Telecommunications Union-Telecommunication G.681) Recommendation, which is hereby incorporated by reference, states that a transmission terminal should enter an automatic laser shutdown (ALS) state that disconnects the main optical signals, when the optical fiber of the transmission system is cut.

FIG. 1 illustrates an optical transmission system having a series of main optical signal transmission units 1 and 2 interconnected by an optical fiber media. If the optical fiber is cut at point A, such that the main optical signal flowing between the two transmission units 1 and 2 is blocked, transmission system 1 senses this blocking state and disables the transmission of the main optical signal, in accordance with the ITU-T G.681 Recommendation. Thus, the optical transmission system goes into an ALS state. This procedure is called an automatic laser shutdown. Similarly, the ALS procedure is initiated for any type of main optical signal blockage occurring between two transmission units 1 and 2 of an optical transmission system.

To determine that a transmission unit 1, 2 has entered the ALS state and stopped transmitting, the operator must either check the ALS state of the transmission unit 1, 2, through a user interface of the equipment, or measure the optical power transmitted through the fiber. Oftentimes, the user interface does not provide a convenient way to check the ALS state of a transmission unit 1 and 2, such as when it is remotely located from the optical fiber cut. If the ALS state is not confirmed prior to handling the fiber, the operator may inadvertently expose himself to the high power optical signal and be injured. Therefore, a means for visually confirming the ALS state, right after the ALS state has been set, is needed.

SUMMARY OF THE INVENTION

An object of the invention is to solve at least the above problems and/or disadvantages and to provide at least the advantages described hereinafter.

An object of the present invention is to provide an apparatus and method for visualizing an ALS state at a cut position. Another object of the invention is to provide an apparatus and method for visualizing an ALS state that may be easily used in the process of restoring a cut optical fiber.

To achieve the above objects, a low-power visible light is conveyed through the optical fiber, when the ALS state is active. This visible light may be seen by the operator, at the cut point, through the surface of the optical fiber. Because the visible light is transmitted at low power it will not injure the operator. The presence of the visible light positively identifies an active ALS state and its absence positively identifies an inactive ALS state.

In a first embodiment, the present invention has a main optical signal transmitting/receiving unit for transmitting and receiving a main optical signal of high power; an ALS visualization light source unit for outputting ALS visible light; an ALS visualization connection unit for selectively outputting a main optical signal and ALS visible light according to the state of the system; and a control unit for controlling the operation of the entire system.

In a second embodiment, the invention has a visible light source for generating ALS visible light; an optical circulating unit for outputting ALS visible light toward the fiber cut; an optical detector for measuring the power of the ALS visible light reflected from the cut surface of the optical fiber; a light source driving unit for adjusting the output power of the visible light; and a signal processing unit for calculating the distance between the visible light source and the fiber cut by comparing the measured power levels of the visible light at the respective locations.

A third embodiment of the invention is a method for visualizing an ALS state, having the steps of: transmitting ALS visible light to an optical fiber when the optical fiber is cut; checking the cut position of the optical fiber by measuring the power of the ALS visible light reflected from the surface of the optical fiber at the cut position; and transmitting a main optical signal to the optical fiber when the optical fiber is restored.

The objects of the present invention can be achieved in whole or in part by an apparatus for visualizing an automatic laser shutdown (ALS) state in an optical transmission system, comprising: a visible light source that outputs a visible light; a main signal source that outputs a high power optical signal; and an ALS connection unit that connects the main signal source with an optic medium in a normal system state and disconnects the main signal source from the optic medium and connects the visible light source to the optic medium when an ALS state is initiated.

The objects of the present invention can be achieved in whole or in part by a method for visualizing an automatic laser shutdown (ALS) state in an optical transmission system, comprising: detecting a discontinuity in an optic medium; disconnecting a main power signal source from the optic medium when the discontinuity is detected; and connecting a visible light source that outputs visible light to the optic medium after the main signal source is disconnected from the optic medium.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

Preferred embodiments of the invention will be described in detail with reference to the following drawings in which like reference numerals refer to like elements wherein:

FIG. 5 illustrates the process flow of a method for visualizing an automatic laser shutdown state in an optical transmission system.

DETAILED DESCRIPTION OF PREFERRED EMBODIMENTS

Figure 1:
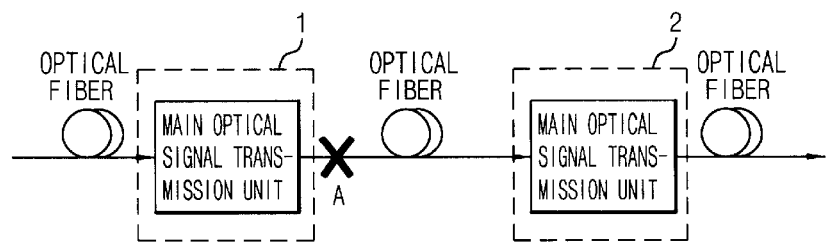
FIG. 1 illustrates an optical transmission system having a series of main optical transmission units interconnected by an optical fiber media.
Figure 2:
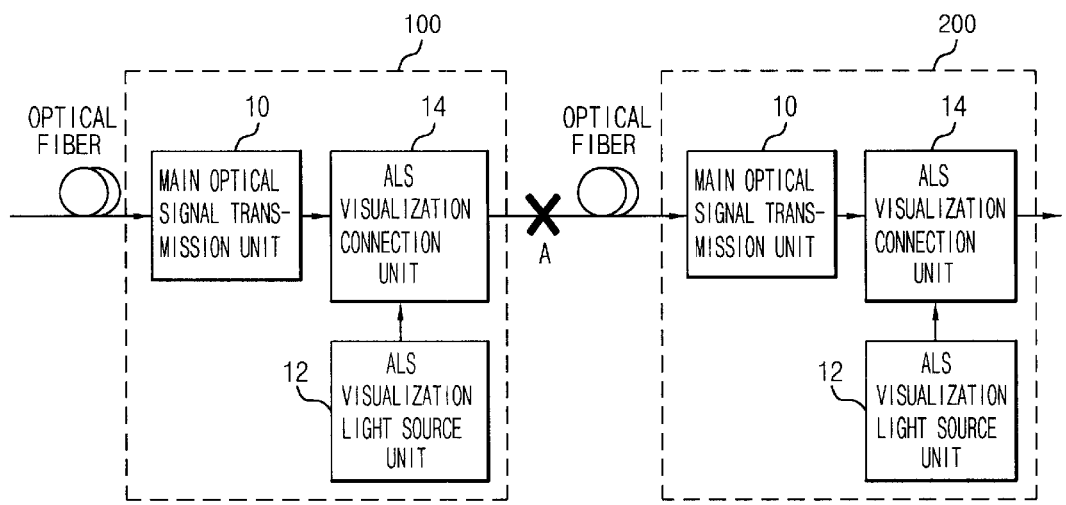
FIG. 2 illustrates an apparatus for visualizing an automatic laser shutdown state in an optical transmission system.

FIG. 2 is a block diagram illustrating an apparatus for visualizing an ALS state. Optical transmission systems 100 and 200 are interconnected by an optical fiber media and constructed identically. Each transmission system 100, 200 has a main optical signal transmitting/receiving unit 10 that transmits/receives a main optical signal having a wavelength of 1300 nm–1700 nm; an ALS visualization light source unit 12 that transmits an ALS visible light having a wavelength of 400 nm–900 nm; and an ALS visualization connection unit 14 that selectively passes either the main optical signal or the ALS visible light, according to the state of the system. The main optical signal transmission unit 10 is preferably constructed of an optical transceiver or an optical amplifier. The ALS visualization connection unit 14 outputs the main optical signal to the optical fiber, when the system is in the normal state, and outputs the ALS visible light to the optical fiber when the ALS state is active.

Figure 3:
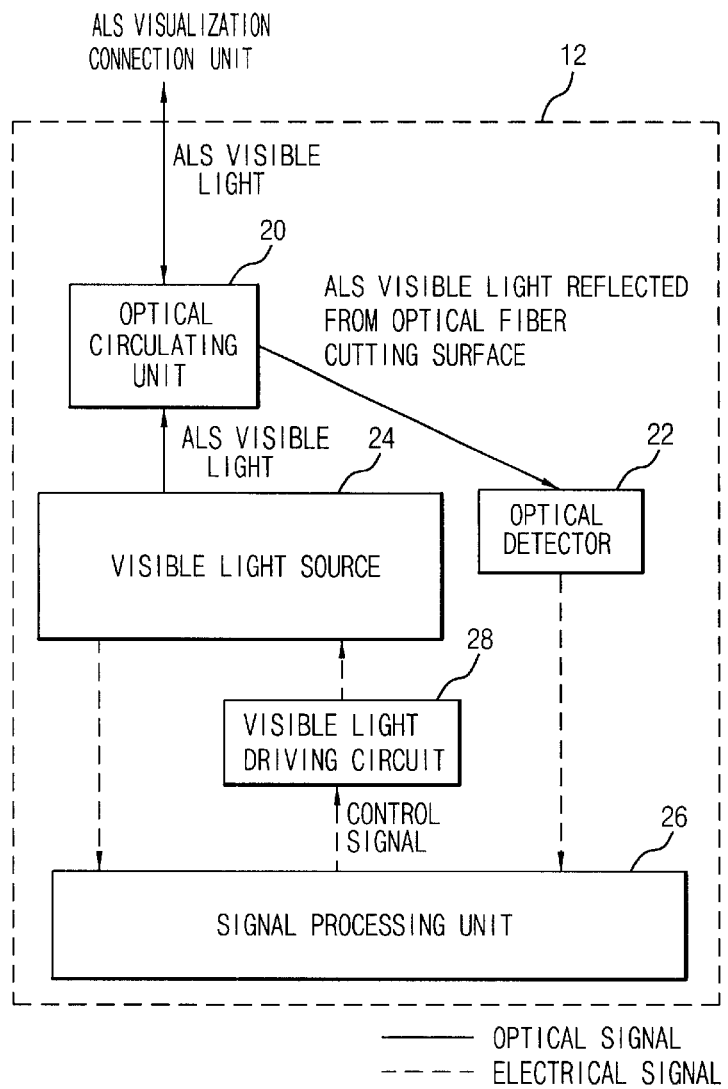
FIG. 3 illustrates the ALS visualization light source unit of FIG. 2 in greater detail.

FIG. 3 illustrates in greater detail the ALS visible light source unit 12 of FIG. 2. The visible light source unit 12 comprises an optical circulating unit 20, an optical detector 22, a visible light source 24, a visible light driving circuit 28, and a signal processing unit 26. The optical circulating unit 20 receives visible light from visible light source 24 and conveys this light to the fiber cut, via the visualization connection unit 14 and the optical fiber medium. At the cut location, visible light is reflected by the fiber cut back to the optical transmission system 100, 200 that generated the visible light. This reflected light is received by the optical circulating unit 20, via the visualization connection unit 14, and conveyed to the optical detector 22. The optical detector 22 measures the power of the received visible light and informs the signal processing unit 26 of the measured value. Signal processing unit 26 serves a dual purpose. Firstly, it adjusts the power of the visible light generated by the visible light source 24 through a control signal that is provided to the visible light driving circuit 28. Operating in conjunction with the driving circuit 28, the visible light source 24 modulates the transmitted power level of the visible light in accordance with the control signal. Secondly, the signal processing unit calculates the distance between the cut location and the transmission system 100, 200 by comparing the relative power levels of the transmitted light and its reflection. Preferably, the visible light source generates light having a wavelength of 400–900 nm, the optical circulating unit 20 is implemented with an optical coupler, and the visible light source 24 uses a laser diode or a light emitting diode.

Figure 4:
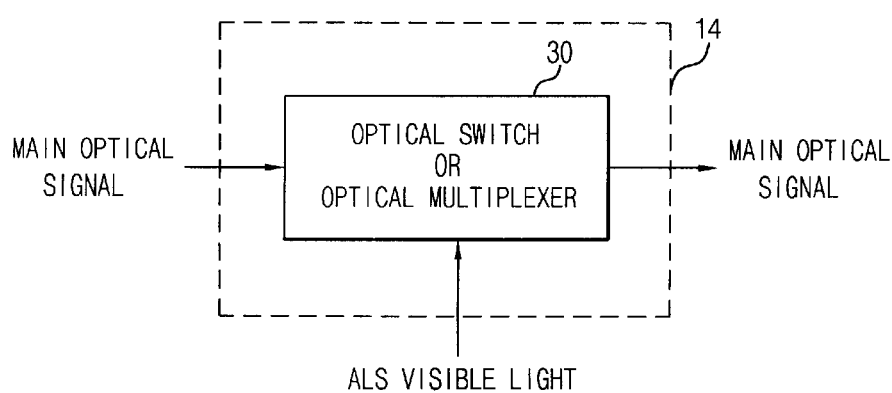
FIG. 4 illustrates the ALS visualization connection unit of FIG. 2 in greater detail.

As illustrated in FIG. 4, the ALS visualization connection unit 14 is preferably constructed of an optical switch 30. The optical switch 30 passes the main optical signal in a normal state and passes the ALS visible light in the ALS state. The ALS visualization connection unit 14 may also be preferably constructed of an optical multiplexer. An optical multiplexer may be used because the wavelength of the main optical signal preferably ranges from 1300 nm to 1700 nm, and the wavelength of the ALS visible light ranges from 400 nm to 900 nm.

FIG. 5 illustrates the operational process performed by the transmission unit 100, 200 of FIG. 2 when the ALS state is active. Additionally, the flow chart of FIG. 5 illustrates the operation of the transmission units 100, 200 when the ALS state is inactive, that is, when a normal state exists.

When the optical transmission system 100, 200 is in the normal state, the main optical signal outputted from the main optical signal transmitting/receiving unit 10 is transmitted to the optical fiber through the ALS visualization connection unit 14, as illustrated in FIG. 2. However, if the optical fiber is cut at point A, or a connector is removed from the transmission/receiving equipment, the main high-power optical signal flowing through the optical fiber is disabled by the transmission system 100, 200 sourcing it and the sourcing transmission system 100, 200 transitions to the ALS state. Therefore, if the disconnection of the main optical signal flowing through the optical fiber is detected, the control unit (not shown) of the optical transmission system 100 is transitioned to the ALS state and the main optical signal outputted from the main optical signal transmitting/receiving unit 10 is disabled in steps S10 and step S11.

To disable the transmission of the main optical signal, the control unit switches the optical switch 30 from passing the main optical signal of the transmitting/receiving unit 10 to passing the visible light of the ALS visualization light source unit 12, by controlling the ALS visualization connection unit 14 in step S12.

Upon completing the switching operation, the signal processing unit 26 sends a control signal to the visible light driving circuit 28 indicating a particular drive level. In turn, the driving circuit 28 causes the visible light source to generate visible light having a certain power level. The generated visible light is conveyed to the optical fiber that has the cut by the ALS visualization connection unit 14, after passing through the optical circulating unit 20. To promote security, the power of the ALS visible light may be kept low. The above-described process is indicated in FIG. 5 by step S13.

Afterwards, if the ALS visible light is reflected from the cut surface of the optical fiber, the reflected ALS visible light is inputted to the optical detector 22, via an optical switch unit 30 and an optical circulating unit 20. Optical detector 22 measures the power of the reflected ALS visible light and outputs the measured value to the signal processing unit 26, as indicated in step S14.

The signal processing unit 26 calculates the distance between the transmission system 100, 200 and the reflecting surface of the optical fiber cut by comparing the power of the reflected ALS visible light, detected by the optical detector 22, and that of the ALS visible light outputted from the visible light source 24, as indicated in step S15. In other words, the signal processing unit 26 calculates the distance between its position and the optical fiber cut surface based on the transmission loss of the ALS visible light, the insertion loss of the optical device, the output power of the ALS visible light from the visible light source 24, and the power of the reflected ALS visible light measured by the optical detector 22. Once the distance calculation is complete, signal processing unit 26 adjusts the output power of the visible light source 24 so that it reaches a predetermined level. The signal processing unit 26 adjusts the power by controlling the light source driving circuit 28 in step S16.

The operator may determine the ALS state by looking for ALS visible light flowing from the optical fiber cut surface. The presence of visible light in the optical fiber indicates an active ALS state and the absence of visible light indicates an inactive ALS state. Additionally, the operator may determine the approximate location of the fiber cut by obtaining a readout of the calculated distance from the signal processing unit 26. Knowing the approximate distance, the operator may more easily find the cut and restore the optical fiber to operational condition. Moreover, by visually determining the ALS state at the cut site, the operator may avoid being injured by the inadvertent transmission of the main optical signal.

The control unit continually checks whether the cut optical fiber is restored in step S17. If the cut optical fiber is not restored to normal, steps S13–S16 are repeatedly performed. If the optical fiber is restored to normal, the ALS visible light is turned off in step S17. Then, the control unit switches the optical switch 30 of the ALS visualization connection unit 14 to convey the main optical signal, in step S18. Finally, if the ALS state is released, the control unit performs a normal optical transmission operation by driving the main optical signal transmitting/receiving unit 10 in step S19.

Thus, the present invention visually informs the operator of the ALS state by disconnecting the main optical signal, passing the ALS visible light to the optical fiber, and effusing the ALS visible light at the cut position of the optical fiber, when the system is transitioned to the ALS state. If an optical multiplexer is used for the ALS visualization connection unit instead of the optical switch, then steps S12 and S19 can be omitted from the above-described process.

As described above, the apparatus and method for visualizing an ALS state according to the present invention is effective in that the operator located at the cut position of the optical fiber can be visually informed of the ALS state visually by passing an ALS visible light indicating the ALS state to the optical fiber, when the optical fiber is cut. In addition, the present invention is effective in that the cut optical fiber can be easily restored by calculating the distance between the transmission system 100, 200 and the cut position by comparing the power of the ALS visible light reflected from the cut surface of the optical fiber and that of the transmitting ALS visible light The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for visualizing an automatic laser shutdown (ALS) state in an optical transmission system, comprising:
   a main optical signal transmitting and receiving unit that transmits and receives a main optical signal having a high power to an optical fiber;
   an ALS visualization light source unit that generates a first ALS visible light; and
   an ALS visualization connection unit that selectively outputs either the main optical signal or the first ALS visible light to the optical fiber, according to a state of the system.

2. The apparatus of claim 1, wherein the ALS visualization light source unit comprises:
   a visible light source that generates the first ALS visible light;
   an optical circulating unit that outputs the generated first ALS visible light to the optical fiber;
   an optical detector that inputs and measures the power of a second ALS visible light reflected from a cut surface of the optical fiber and received via the optical circulating unit;
   a signal processing unit that calculates the distance between the apparatus position and the cut surface of the optical fiber by comparing the powers of the first and second ALS visible lights, and the signal processing unit generates a driving signal of the visible light source; and
   a light source driving unit that adjusts the output power of the visible light source based on the driving signal, wherein
   the second ALS visible light is a reflection of the first ALS visible light.

3. The apparatus of claim 2, wherein the optical circulating unit is constructed of an optical coupler, an optical switch, or an optical circulator.

4. The apparatus of claim 2, wherein the visible light source is a laser diode or a light emitting diode generating visible light having a wavelength of 400 nm–900 nm.

5. The apparatus of claim 1, wherein the ALS visualization connection unit outputs the main optical signal to the optical fiber in a normal state and outputs the first ALS visible light to the optical fiber in the ALS state.

6. The apparatus of claim 1, wherein the ALS visualization connection unit is constructed of an optical switch, an optical coupler, or an optical multiplexer.

7. An apparatus for visualizing an automatic laser shutdown (ALS) state in an optical transmission system, comprising:
   a main optical signal transmitting and receiving unit that transmits and receives a main optical signal of high power;
   an ALS visualization light source unit that outputs a first ALS visible light;
   an ALS visualization connection unit that outputs the main optical signal to an optical fiber in a normal state and outputs the first ALS visible light to the optical fiber in an ALS state; wherein the ALS visualization light source unit comprises:
   a visible light source that generates the first ALS visible light;
   an optical circulating unit that outputs the generated first ALS visible light to the optical fiber;
   an optical detector that measures the power of a second ALS visible light reflected from a cut surface of the optical fiber and received via the optical circulating unit;
   a light source driving unit that adjusts an output power of the first visible light source; and
   a signal processing unit that calculates the distance between the apparatus position and the cut position of the optical fiber by comparing the powers of the first and second ALS visible lights and the signal processing unit controls the light source driving unit, wherein the second ALS visible light is a reflection of the first ALS visible light.

8. The apparatus of claim 7, wherein the optical circulating unit is constructed of an optical coupler, an optical switch, or optical circulator.

9. The apparatus of claim 7, wherein the visible light source is a laser diode or a light emitting diode.

10. The apparatus of claim 7, wherein the ALS visualization connection unit is constructed of an optical switch, an optical coupler, or an optical multiplexer.

11. A method for visualizing an automatic laser shutdown (ALS) state in an optical transmission system, comprising:

disconnecting a main optical signal when an ALS state is detected and transmitting a first ALS visible light to an optical fiber;

detecting a second ALS visible light reflected from a cut surface of the optical fiber, which second ALS visible light is a reflection of the first ALS visible light;

adjusting an output power of the first ALS visible light so that a power of the second ALS visible light reaches a predetermined level; and comparing the powers of the first and second ALS visible lights.

12. The method of claim 11, wherein the main optical signal has a wavelength of 1300 nm–1700 nm and the first ALS visible light has a wavelength of 400 nm–900 nm.

13. The method of claim 11, wherein the first ALS visible light is generated by a laser diode or a light emitting diode.

14. A method for visualizing an automatic laser shutdown (ALS) state in an optical transmission system, comprising:

transmitting a first ALS visible light to an optical fiber when an ALS state is detected;

detecting a second ALS visible light reflected from a cut surface of the optical fiber, which second ALS visible light is a reflection of the first ALS visible light;

determining the cut position of the optical fiber by comparing the respective powers of the first and second ALS visible lights; and restoring the cut optical fiber.

15. The method of claim 14, further comprising adjusting the output power of the first ALS visible light so that the power of the second ALS visible light reaches a predetermined level.

16. The method of claim 14, further comprising disconnecting the first ALS visible light and transmitting the main optical signal to the optical fiber when the optical fiber is normally restored.

17. The method of claim 14, wherein the first ALS visible light is generated by a laser diode or a light emitting diode.

18. The method of claim 14, wherein the cut position of the optical fiber is calculated based on the powers of the first and second ALS visible lights, a transmission loss of the first and second ALS visible lights, and an insertion loss in an optical device.

19. An apparatus for visualizing an automatic laser shutdown (ALS) state in an optical transmission system, comprising:

a visible light source that outputs a visible light;

a main signal source that outputs a high power optical signal; and an ALS connection unit that connects the main signal source with an optic medium in a normal system state and disconnects the main signal source from the optic medium and connects the visible light source to the optic medium when an ALS state is initiated.

20. The apparatus of claim 19, further comprising a detector that compares a power level of the visible light output by the visible light source and a power level of the visible light reflected back to the apparatus by a discontinuity of the optic medium.

21. The apparatus of claim 20, further comprising a processor that determines a distance between the apparatus and the discontinuity based on the relative power levels of the visible light output by the visible light source and the visible light reflected back to the apparatus.

22. The apparatus of claim 19, wherein the main signal source generates light having a wavelength of 1300 nm–1700 nm and having an output power of a number of watts.

23. The apparatus of claim 19, wherein the apparatus automatically transitions between the normal state and the ALS state when a discontinuity occurs in the optic medium and automatically transitions from the ALS state to the normal state when the optic medium is restored.

24. A method for visualizing an automatic laser shutdown (ALS) state in an optical transmission system, comprising:

detecting a discontinuity in an optic medium;

disconnecting a main power signal source from the optic medium when the discontinuity is detected; and connecting a visible light source that outputs visible light to the optic medium after the main signal source is disconnected from the optic medium.

25. The method of claim 24, further comprising:

measuring a power level of the visible light reflected back to the apparatus by the discontinuity; and determining a distance between the apparatus and the discontinuity based on the relative power level of the visible light output by the visible light source and the measured power level of the reflected light.

26. The method of claim 25, further comprising:

locating the discontinuity based on the determined distance;

detecting an ALS state by the presence of the visible light emanating from the discontinuity; and detecting a normal state by the absence of the visible light emanating from the discontinuity, wherein the ALS state indicates the main power signal source is disconnected from the optic medium and the normal state indicates the main power signal source is connected to the optic medium.

27. The method of claim 24, further comprising:

detecting an ALS state by the presence of the visible light emanating from the discontinuity; and detecting a normal state by the absence of the visible light emanating from the discontinuity, wherein the ALS state indicates the main power signal source is disconnected from the optic medium and the normal state indicates the main power signal source is connected to the optic medium.

28. The method of claim 27, wherein the main signal source generates light having a wavelength of 1300 nm–1700 nm and having a power of a number of watts.

29. The method of claim 24, further comprising:

detecting when the discontinuity is repaired;

disconnecting the visible light source from the optic medium when the discontinuity is repaired; and connecting the main signal source to the optic medium after the visible light source is disconnected from the optic medium.

30. The method of claim 29, wherein:

detecting the discontinuity and the repair of the discontinuity are performed automatically.

* * * * *